(12) United States Patent
Fulcher et al.

(10) Patent No.: US 7,111,454 B2
(45) Date of Patent: Sep. 26, 2006

(54) FUEL CONTROL COMPENSATION FOR SECONDARY AIR SYSTEM FLOW VARIATION

(75) Inventors: Stephen K. Fulcher, Milford, MI (US); Richard B. Jess, Haslett, MI (US); Patrick L. Risse, Rochester Hills, MI (US); Stuart R. Smith, Howell, MI (US); James A. Eng, Troy, MI (US)

(73) Assignee: General Motors Corporation, Detroit, MI (US)

( * ) Notice: Subject to any disclaimer, the term of this patent is extended or adjusted under 35 U.S.C. 154(b) by 62 days.

(21) Appl. No.: 10/918,581

(22) Filed: Aug. 13, 2004

(65) Prior Publication Data

US 2006/0042232 A1    Mar. 2, 2006

(51) Int. Cl.
*F01N 3/00*    (2006.01)
(52) U.S. Cl. ............... 60/289; 60/274; 60/285; 60/287; 60/290; 60/292
(58) Field of Classification Search ............ 60/274, 60/285, 287, 288, 289, 290, 291, 292, 293, 60/307
See application file for complete search history.

(56) References Cited

U.S. PATENT DOCUMENTS

| | | | | |
|---|---|---|---|---|
| 5,235,956 A | * | 8/1993 | Yoshizaki | 123/585 |
| 6,085,517 A | * | 7/2000 | Bayerle et al. | 60/274 |
| 6,715,280 B1 | * | 4/2004 | Lewis et al. | 60/274 |
| 6,830,043 B1 | * | 12/2004 | Morinaga et al. | 123/698 |
| 6,918,245 B1 | * | 7/2005 | Hirooka et al. | 60/289 |
| 6,966,177 B1 | * | 11/2005 | Koyama et al. | 60/277 |

* cited by examiner

*Primary Examiner*—Binh Q. Tran
(74) *Attorney, Agent, or Firm*—Christopher DeVries

(57) ABSTRACT

An engine control system and method maintains an optimum exhaust fuel to air ratio in an internal combustion engine. A secondary air injection (SAI) pressure is measured in an SAI system. The SAI pressure measurement is converted into an SAI flow value. A fuel compensation value is obtained based on the SAI flow value. Fuel delivery is compensated to the engine based on the fuel compensation value. In a second embodiment, the fuel compensation value is obtained based on the SAI pressure measurement. Fuel delivery is compensated to the engine based on the fuel compensation value. In a third embodiment, a primary flow value is calculated at an air intake of the engine. A fuel compensation value is calculated based on the SAI flow and primary flow values. Fuel delivery to the engine is compensated based on the fuel compensation value.

8 Claims, 3 Drawing Sheets

FUEL CONTROL COMPENSATION FOR SECONDARY AIR SYSTEM FLOW VARIATION

FIELD OF THE INVENTION

The present invention relates to exhaust fuel to air ratio management, and more particularly to utilizing fuel compensation for secondary air injection flow to control the exhaust fuel to air ratio.

BACKGROUND OF THE INVENTION

It is known to use a catalytic converter in the exhaust gas flow path of a motor vehicle with an internal combustion engine. The catalytic converter includes a substrate with a coating of a catalyst material that catalyzes the oxidation of hydrocarbon molecules and carbon monoxide molecules as well as the reduction of nitrogen oxides emitted in the vehicle exhaust gas. The catalyst performs efficiently when the catalyst is above a minimum temperature to stimulate the desired oxidation and the exhaust gas has the proper fuel to air ratio (F/A).

It is desirable to optimize the fuel to air ratio delivered to the engine for performance as well as emissions control. Emissions control is increasingly difficult at startup because a higher fraction of delivered fuel remains unburned and is subsequently exhausted, and the catalyst has not reached its operating temperature. Methods have been employed to reduce exhaust emissions and increase catalytic converter performance including increasing engine speed at idle, retarding ignition timing and/or reducing delivered fuel. These methods however have been known to have drawbacks. For instance, increasing idle speed reduces fuel economy and may increase engine noise and vibration. In addition, ignition retard and fuel reduction may cause a rough idle.

One method for improving catalytic converter performance during startup is by utilizing a secondary air injection (SAI) system. The output of an SAI pump is disposed in the exhaust system upstream of the catalytic converter and is used to inject air into the exhaust to react with unburned and partially burned fuel from the engine in order to heat up the catalyst. Because of SAI pump flow variation however, it is difficult to provide the optimal exhaust fuel to air ratio from one vehicle to another, over various engine operating and environmental conditions, and as the pump performance degrades with age. That is, the secondary air injected into the exhaust may not yield the optimal exhaust F/A entering the catalytic converter on a consistent basis.

SUMMARY OF THE INVENTION

An engine control system and method maintains an optimum exhaust F/A in an internal combustion engine. SAI system pressure is measured and converted into an SAI system flow calculation. A fuel compensation value is generated based on this SAI flow calculation. Fuel delivery to the engine is compensated based on the fuel compensation value.

In other features, fuel delivery to the engine is reduced for a fuel compensation value below a predetermined value and is increased for a fuel compensation value above the predetermined value. The fuel compensation value is generated by a function that is accessed based on the SAI system flow calculation. This flow calculation is generated by a function that is accessed based on the SAI system pressure measurement.

An engine control system and method maintains an optimum exhaust F/A in an internal combustion engine. SAI system pressure is measured. A fuel compensation value is generated based on this SAI system pressure measurement. Fuel delivery to the engine is compensated based on the fuel compensation value.

In other features, fuel delivery to the engine is reduced for a fuel compensation value below a predetermined value and is increased for a fuel compensation value above the predetermined value. The fuel compensation value is generated by a function that is accessed based on the SAI system pressure measurement.

An engine control system and method maintains an optimum exhaust F/A in an internal combustion engine. This predetermined optimum fuel to air ratio is fixed based on a primary flow calculation, which is determined from inputs from various sensors such as Mass-Airflow (MAF) and/or Manifold Air Pressure (MAP), Intake Air Temperature (IAT), engine speed (RPM), and from engine specifications. SAI system pressure is measured and converted into an SAI system flow calculation. A fuel compensation value is calculated based on the primary and SAI flow calculations. Fuel delivery to the engine is compensated based on the fuel compensation value.

In other features, the SAI system pressure measurement is converted into a flow calculation. The fuel compensation value is based on a desired exhaust F/A. The desired exhaust F/A is proportional to the product of the compensated F/A and the primary flow divided by the sum of the primary and SAI flows.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
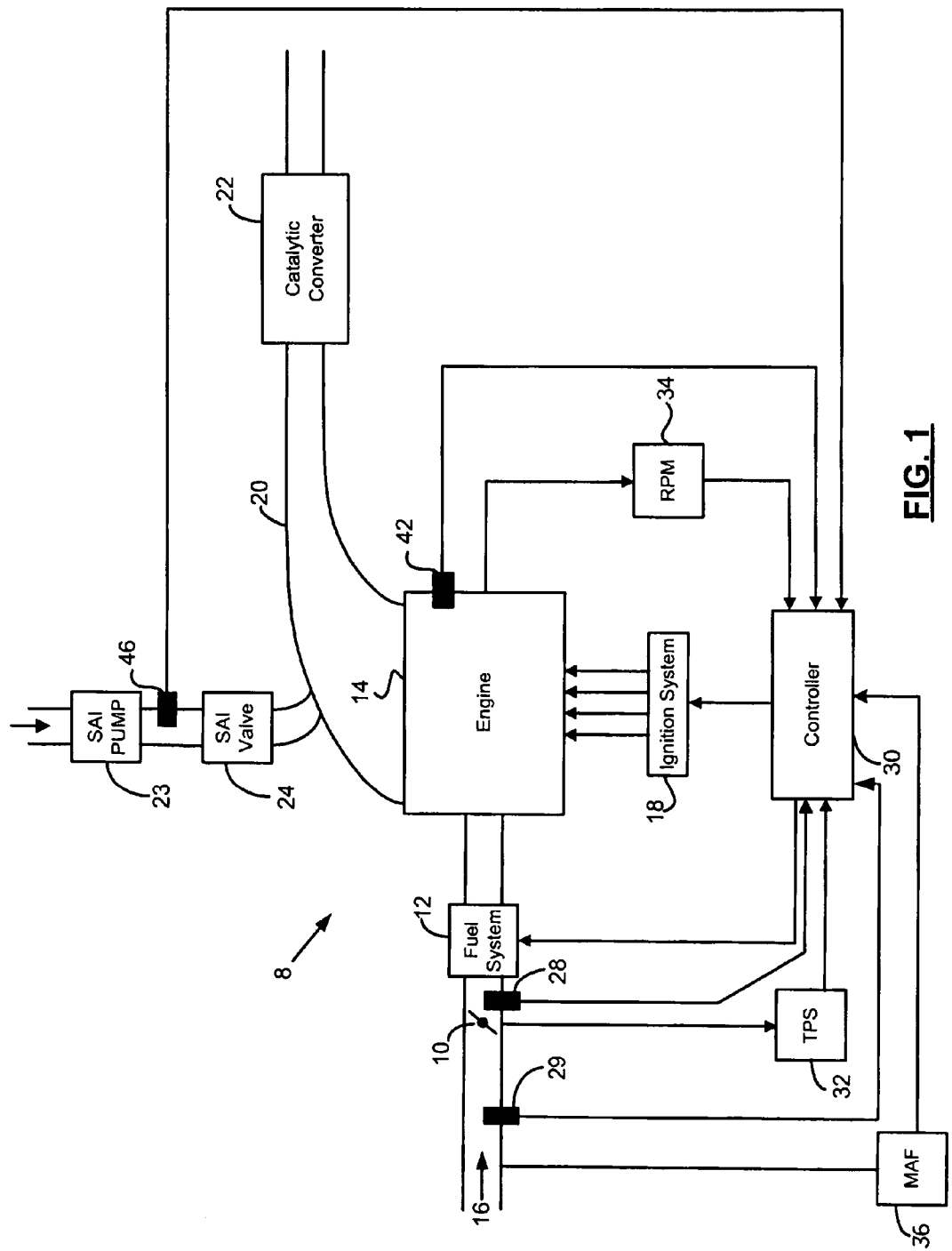
FIG. 1 is a functional block diagram of an engine control system that controls fuel to air ratio according to the present invention.

Referring to FIG. 1, an exemplary engine control system 8 is shown. A throttle 10 and a fuel system 12 determine the fuel and primary air delivered to an engine 14 through an intake 16. An ignition system 18 ignites the fuel and primary air mixture in the engine 14. Exhaust gas created by the ignition of the fuel and primary air mixture is expelled through an exhaust manifold 20. A catalytic converter 22 receives the exhaust gas and reduces the emissions levels of the exhaust gas.

A controller 30 communicates with various components of the engine control system 8, including but not limited to a throttle position sensor 32 (TPS), intake Manifold Air Pressure (MAP) 28, Intake Air Temperature (IAT) 29, the fuel system 12, the ignition system 18, and an engine speed sensor 34 (RPM). The controller 30 receives MAP, IAT and RPM signals and a primary air flow signal from a Mass Air Flow sensor (MAF) 36. MAP, IAT, RPM and MAF signals are used to determine the primary flow into the engine 14. The primary flow data and optimum predetermined uncompensated F/A is then used to calculate fuel delivery from the fuel system 12 to the engine 14. The controller 30 further communicates with the ignition system 18 to determine ignition timing.

The controller 30 may receive additional feedback from other components in the engine control system 8, including but not limited to coolant temperature from a coolant temperature sensor 42 and throttle position from the Throttle Position Sensor (TPS) 32. These and other variables may affect the overall performance and behavior of the engine control system 8. The controller 30 utilizes data gathered from the various engine components to monitor and, in some cases, optimize engine performance.

In the present invention, the controller 30 communicates with an SAI diagnostic pressure sensor or SAI system pressure sensor 46 disposed between the SAI pump (23) and SAI control valve (24). As will be described in greater detail, the SAI system pressure sensor 46 communicates a measured pressure to the controller 30. The controller 30 interprets the measured pressure to determine a fuel adjustment or compensation value to communicate with the fuel system 12. In general, the pressure measured at the SAI pressure sensor 46 is proportional to the SAI flow, which is proportional to the desired fuel compensation. In this way, if a pressure is measured above a desired level, then there exists excessive SAI flow, which results in exhaust that is lean of the optimum F/A and the controller commands increased fuel delivery through the fuel system 12 to return to the optimal F/A. Similarly, if a pressure is measured below a desired level, then there exists insufficient SAI flow, which results in exhaust that is rich of the optimum F/A and the controller commands a reduced fuel delivery through the fuel system 12 to return to the optimal F/A.

The interpretation of the SAI pressure measurement will now be described according to a first embodiment. A pressure measurement is communicated from the SAI pressure sensor 46 to the controller 30. The controller 30 utilizes a function to convert the measured SAI pressure into an SAI flow. The SAI flow is then used in a second function to determine a desired fuel compensation value.

In a second embodiment, the controller 30 interprets a desired fuel compensation value through a third function directly from the measured SAI pressure. In a third embodiment, the primary flow calculation taken at the intake 16 is used in addition to the SAI flow calculation determined from the SAI pressure sensor 46. Specifically, the following mathematical representation is utilized to maintain the optimum exhaust fuel to air ratio (Exhaust F/A).

$$\text{Exhaust } F/A = \frac{\text{Compensated } F/A * \text{Primary flow}}{(\text{Primary flow} + SAI \text{ flow})} \quad (1)$$

where Compensated F/A=Uncompensated F/A* Compensation Value

Figure 2:
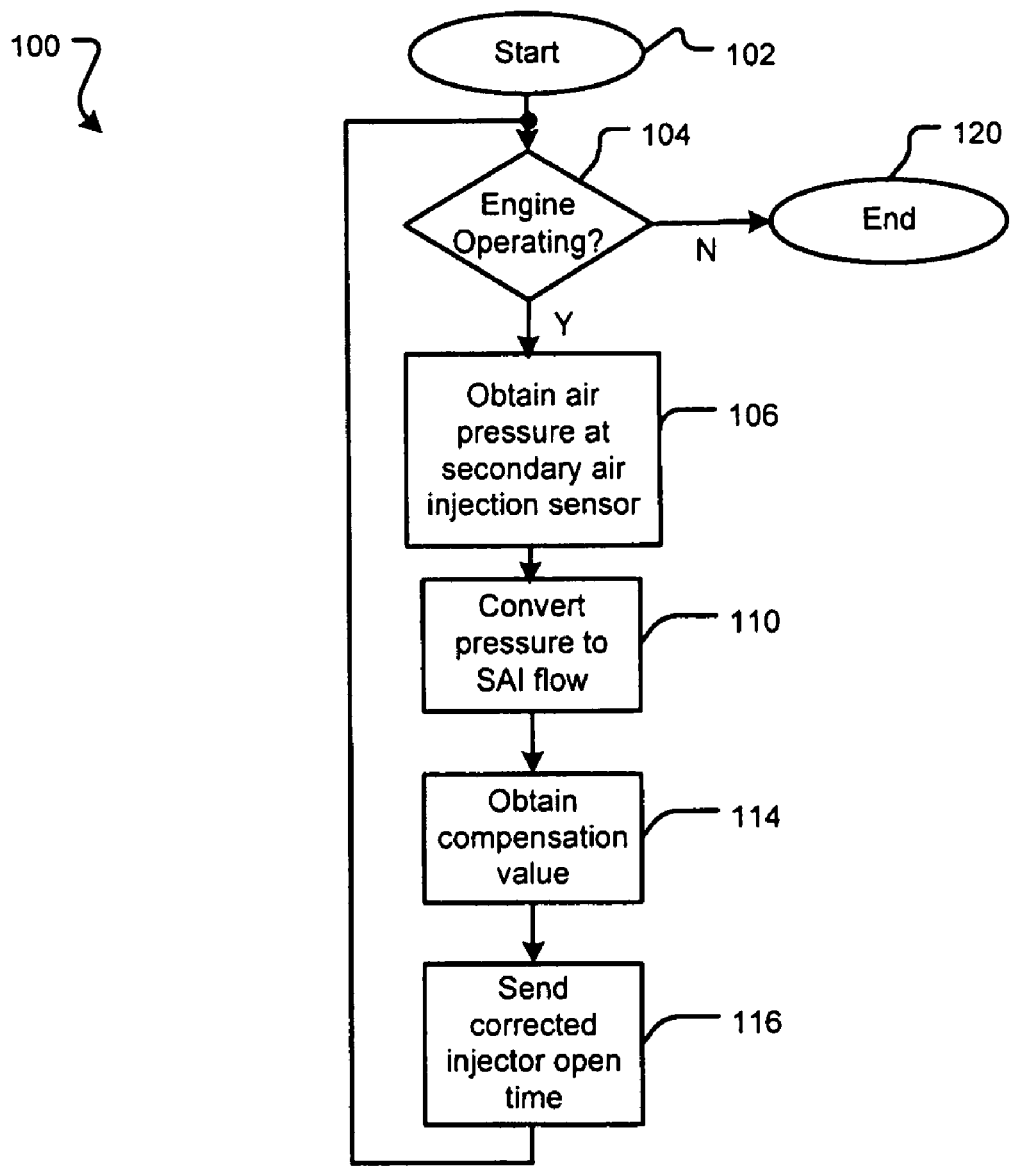
FIG. 2 is a flow diagram illustrating steps for controlling fuel to air ratio according to a first method.

Referring now to FIG. 2, steps for maintaining an optimum Exhaust F/A in an internal combustion engine according to a first embodiment are shown generally at 100. Control begins with step 102. In step 104, the controller 30 determines whether the engine 14 is operating. If not, control ends in step 120. If the engine 14 is operating, an SAI pressure measurement from the SAI pressure sensor 46 is communicated to the controller 30. In step 110, control utilizes a first function to convert the measured pressure into a calculated flow. In step 114, a fuel compensation value or trim factor is determined from a second function. The compensation value corrects the fuel delivery to a predetermined value. If a flow calculation above a predetermined value is communicated, a compensation value is used to increase fuel delivery. Likewise, a flow calculation below a predetermined value will result in a compensation value for reducing fuel delivery. In step 116 the compensation value is used to command a corrected fuel delivery rate. Control then loops to step 104.

Figure 3:
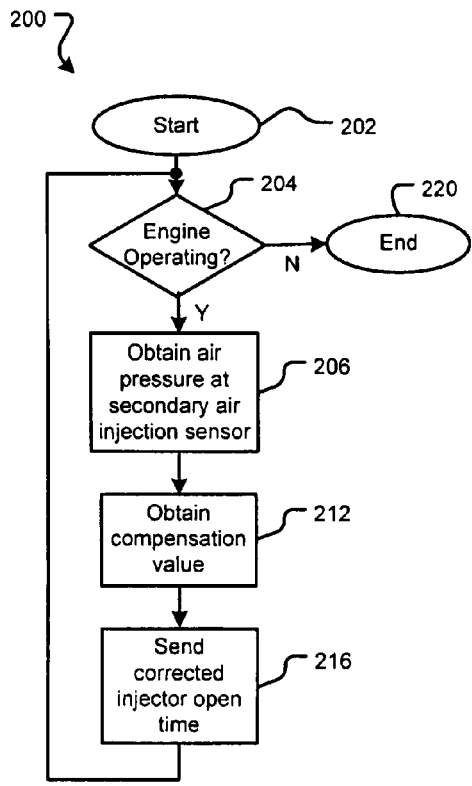
FIG. 3 is a flow diagram illustrating steps for controlling fuel to air ratio according to a second method.

Referring to FIG. 3, steps for maintaining an optimum Exhaust F/A according to a second embodiment are shown generally at 200 wherein similar steps from the first method 100 are identified with a 200 prefix. In the second method 200, a compensation value is determined in step 212 through a function based directly from SAI pressure taken at the SAI pressure sensor 46.

Figure 4:
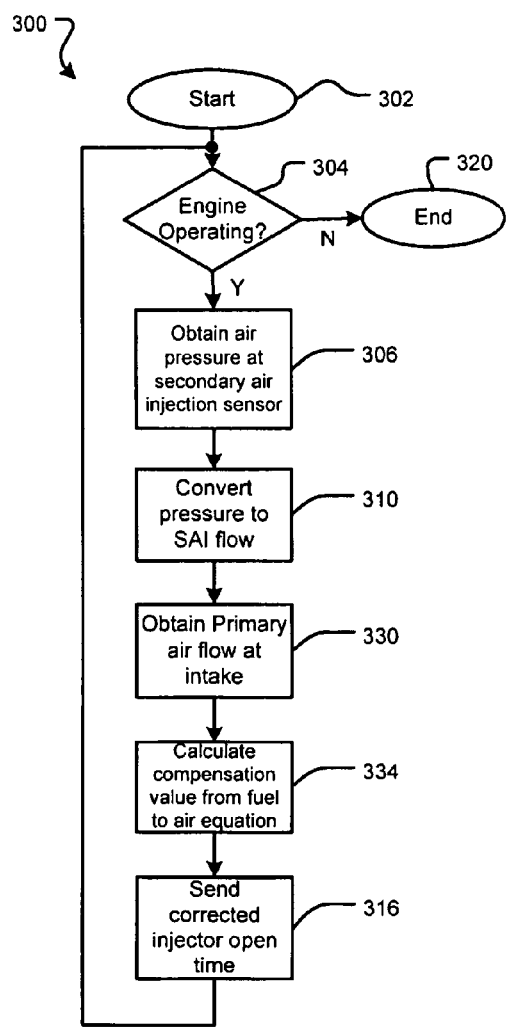
FIG. 4 is a flow diagram illustrating steps for controlling fuel to air ratio according to a third method.

Turning now to FIG. 4, steps for maintaining an optimum Exhaust F/A according to a third embodiment are shown generally at 300. The third method 300 employs similar steps as the first method 100 and is designated with a 300 prefix. In step 330, the primary flow measurement is determined at the Intake 16 by the controller 30. In step 334, a compensation value is determined from the Exhaust F/A equation (1), the primary and SAI flows, and the uncompensated F/A.

Specifically, control utilizes a desired F/A value in equation (1) for the Exhaust F/A and solves for Compensated Engine F/A. Compensated engine F/A is the product of the Uncompensated F/A and the commanded fuel compensation value or trim. Primary flow is the airflow measured at the Intake 16 and SAI flow is a converted airflow calculation taken from the SAI pressure sensor 46 measurements.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system for maintaining an optimum exhaust fuel to air ratio in an internal combustion engine, comprising:
    an engine having an primary air intake and a fuel injection system; an exhaust system connected to said engine and having a catalytic converter;
    a secondary air injection (SAI) system connected to the exhaust system;
    an SAI pressure sensor disposed in said SAI system that generates an SAI pressure measurement;
    a controller that communicates with said SAI pressure sensor, said primary intake and said fuel injection system and that compensates fuel delivery into said engine based directly on said SAI pressure measurement from said SAI pressure sensor; and wherein said controller includes a compensator that receives said SAI pressure measurement and outputs a desired fuel compensation value.

2. The control system of claim 1 wherein said SAI pressure sensor is disposed in said secondary air injection (SAI) system upstream of said catalytic converter.

3. The control system of claim 1 wherein said SAI pressure sensor communicates an SAI pressure measurement to said controller.

4. The control system of claim 3 wherein said controller determines fuel compensation based on said SAI pressure measurement and modifies fuel delivery of said fuel injection system based on said fuel compensation.

5. A method for maintaining an optimum exhaust fuel to air ratio in an internal combustion engine, comprising:

determining an optimum exhaust fuel to air ratio;

measuring a pressure in a secondary injection (SAI) system connected to an exhaust system of the engine;

communicating said measured pressure to a compensator that outputs a desired fuel compensation value based directly on said measured pressure; and compensating fuel delivery to said engine based on said fuel compensation value to achieve a predetermined target.

6. The method of claim 5 wherein measuring a pressure includes measuring a pressure in a secondary injection (SAI) system connected to said exhaust system upstream of a catalytic converter.

7. The method of claim 5 wherein generating a fuel compensation value includes determining a fuel compensation value from a function based on said SAI pressure measurement.

8. The method of claim 5 wherein compensating fuel delivery includes one of reducing fuel delivery to said engine for an SAI pressure measurement below a predetermined value and increasing fuel delivery to said engine for an SAI pressure measurement above said predetermined value.

* * * * *